US011398353B2

(12) United States Patent
Hashimoto (10) Patent No.: US 11,398,353 B2
(45) Date of Patent: Jul. 26, 2022

(54) MULTILAYER CERAMIC CAPACITOR

(71) Applicant: Murata Manufacturing Co., Ltd., Nagaokakyo (JP)

(72) Inventor: Akira Hashimoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 29 days.

(21) Appl. No.: 17/144,189

(22) Filed: Jan. 8, 2021

(65) Prior Publication Data

US 2021/0225594 A1 Jul. 22, 2021

(30) Foreign Application Priority Data

Jan. 17, 2020 (JP) .............................. JP2020-005718

(51) Int. Cl.
| | |
|---|---|
| *H01G 4/30* | (2006.01) |
| *H01G 4/232* | (2006.01) |
| *H01G 4/248* | (2006.01) |
| *H01G 4/008* | (2006.01) |
| *H01G 4/12* | (2006.01) |

(52) U.S. Cl.
CPC .............. *H01G 4/30* (2013.01); *H01G 4/008* (2013.01); *H01G 4/1227* (2013.01); *H01G 4/232* (2013.01); *H01G 4/248* (2013.01)

(58) Field of Classification Search
CPC ...... H01G 4/008; H01G 4/1227; H01G 4/232; H01G 4/248; H01G 4/30
See application file for complete search history.

(56) References Cited

U.S. PATENT DOCUMENTS

| | | | | |
|---|---|---|---|---|
| 9,099,247 | B1* | 8/2015 | Kitano | H01G 4/1227 |
| 10,971,308 | B2* | 4/2021 | Park | H01G 4/012 |
| 11,011,308 | B2* | 5/2021 | Takagi | H01G 4/1236 |
| 11,264,173 | B2* | 3/2022 | Kang | H01G 4/228 |
| 11,276,526 | B2* | 3/2022 | Kang | H01G 4/224 |
| 2014/0311783 | A1* | 10/2014 | Lee | H01G 4/30 |
| | | | | 361/321.2 |
| 2019/0131074 | A1 | 5/2019 | Mizuno | |
| 2019/0164693 | A1* | 5/2019 | Ono | H01G 4/30 |
| 2020/0152390 | A1* | 5/2020 | Yeon | H01G 4/12 |
| 2021/0335548 | A1* | 10/2021 | Ikeda | H01G 2/065 |

FOREIGN PATENT DOCUMENTS

JP  2019-079977 A  5/2019

* cited by examiner

*Primary Examiner* — Nathan Milakovich
(74) *Attorney, Agent, or Firm* — Keating & Bennett, LLP (57) ABSTRACT

In a multilayer ceramic capacitor, when a cross-section obtained by cutting a multilayer body at a position at a central portion in a length direction and defined in a width direction and a layering direction is viewed, a variation in distance in the width direction from a straight line that connects ends of two internal electrodes located outermost in the layering direction to each other to respective ends of internal electrodes is not larger than about 0.2, a first ridgeline portion connecting the straight line that connects the ends of the two internal electrodes to each other to one main surface of the multilayer body has a first curve, a second ridgeline portion that connects one main surface to one side surface of the multilayer body has a second curve, and the first curve is larger in radius of curvature than the second curve.

20 Claims, 8 Drawing Sheets

MULTILAYER CERAMIC CAPACITOR

CROSS REFERENCE TO RELATED APPLICATIONS

This application claims the benefit of priority to Japanese Patent Application No. 2020-005718 filed on Jan. 17, 2020. The entire contents of this application are hereby incorporated herein by reference.

BACKGROUND OF THE INVENTION

1. Field of the Invention

The present invention relates to a multilayer ceramic capacitor.

2. Description of the Related Art

A multilayer ceramic capacitor including a multilayer body in which a plurality of dielectric layers and a plurality of internal electrodes are alternately layered and an external electrode formed on each of opposing end surfaces of the multilayer body has been known.

Japanese Patent Laid-Open No. 2019-79977 describes as one of such multilayer ceramic capacitors, a multilayer ceramic capacitor allegedly capable of achieving prevention of a crack or separation at a joint interface between a layered portion in which dielectric layers and internal electrodes are layered and a side margin portion on a side surface side of the layered portion and covering peripheries of the internal electrodes in a multilayer body. Japanese Patent Laid-Open No. 2019-79977 describes a method of making an unfired multilayer body by providing an unfired side margin portion on a side surface of a multilayer chip obtained by layering a plurality of ceramic green sheets each provided with an internal electrode pattern and cutting the ceramic green sheets.

The side margin portion not contributing to a capacitance of a capacitor is preferably minimized in thickness. With a decrease in the thickness of the side margin portion, a radius of curvature of a ridgeline portion of the multilayer body is smaller. With the smaller radius of curvature, however, chipping is more likely to occur at the ridgeline portion of the multilayer ceramic capacitor.

SUMMARY OF THE INVENTION

Preferred embodiments of the present invention provide multilayer ceramic capacitors that are each capable of reducing or preventing chipping even though a side margin portion is decreased in thickness.

A multilayer ceramic capacitor according to a preferred embodiment of the present invention includes a multilayer body including a plurality of dielectric layers and a plurality of internal electrodes that are layered, the multilayer body including a first main surface and a second main surface opposed to each other in a layering direction of the dielectric layers and the internal electrodes, a first side surface and a second side surface opposed to each other in a width direction orthogonal or substantially orthogonal to the layering direction, and a first end surface and a second end surface opposed to each other in a length direction orthogonal or substantially orthogonal to the layering direction and the width direction, and an external electrode electrically connected to the internal electrodes and provided on each of the first end surface and the second end surface of the multilayer body, wherein when a cross-section obtained by cutting the multilayer body at a position at a central portion in the length direction and defined in the width direction and the layering direction is viewed, a variation in distance in a width direction W from a straight line that connects ends of two of the internal electrodes located outermost in the layering direction to each other to respective ends of the plurality of internal electrodes is not larger than about 0.2, a first ridgeline portion that connects the straight line that connects the ends of two of the internal electrodes located outermost in the layering direction to each other to one of the first main surface and the second main surface has a first curve, and a second ridgeline portion that connects one of the first main surface and the second main surface to one of the first side surface and the second side surface has a second curve, and the first curve has a larger radius of curvature than the second curve.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings.

First Preferred Embodiment

Figure 1:
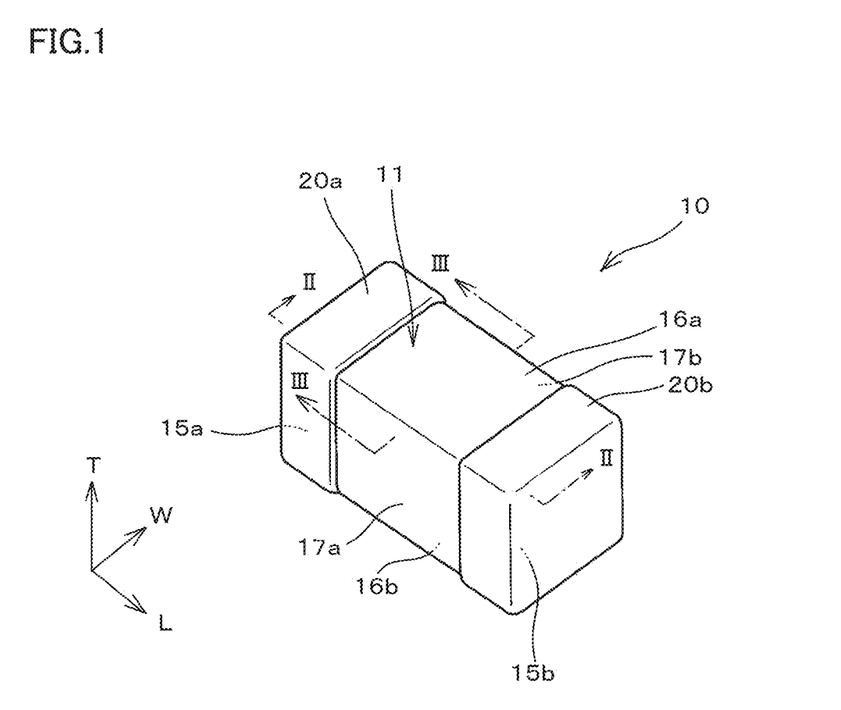
FIG. 1 is a perspective view schematically showing a multilayer ceramic capacitor according to a first preferred embodiment of the present invention.
Figure 2:
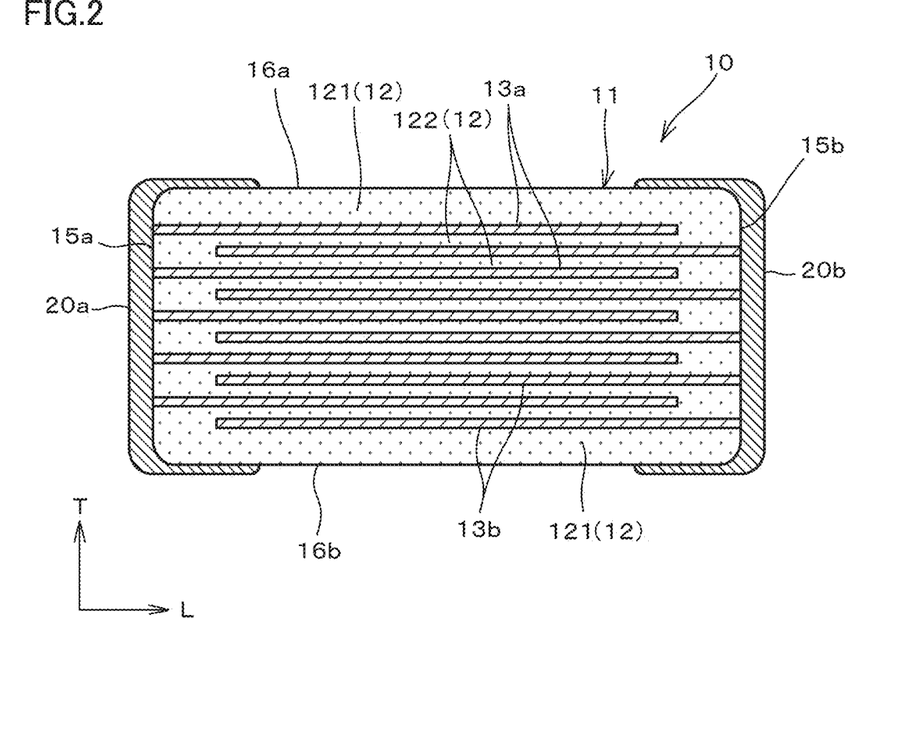
FIG. 2 is a schematic cross-sectional view along the line II-II of the multilayer ceramic capacitor shown in FIG. 1.
Figure 3:
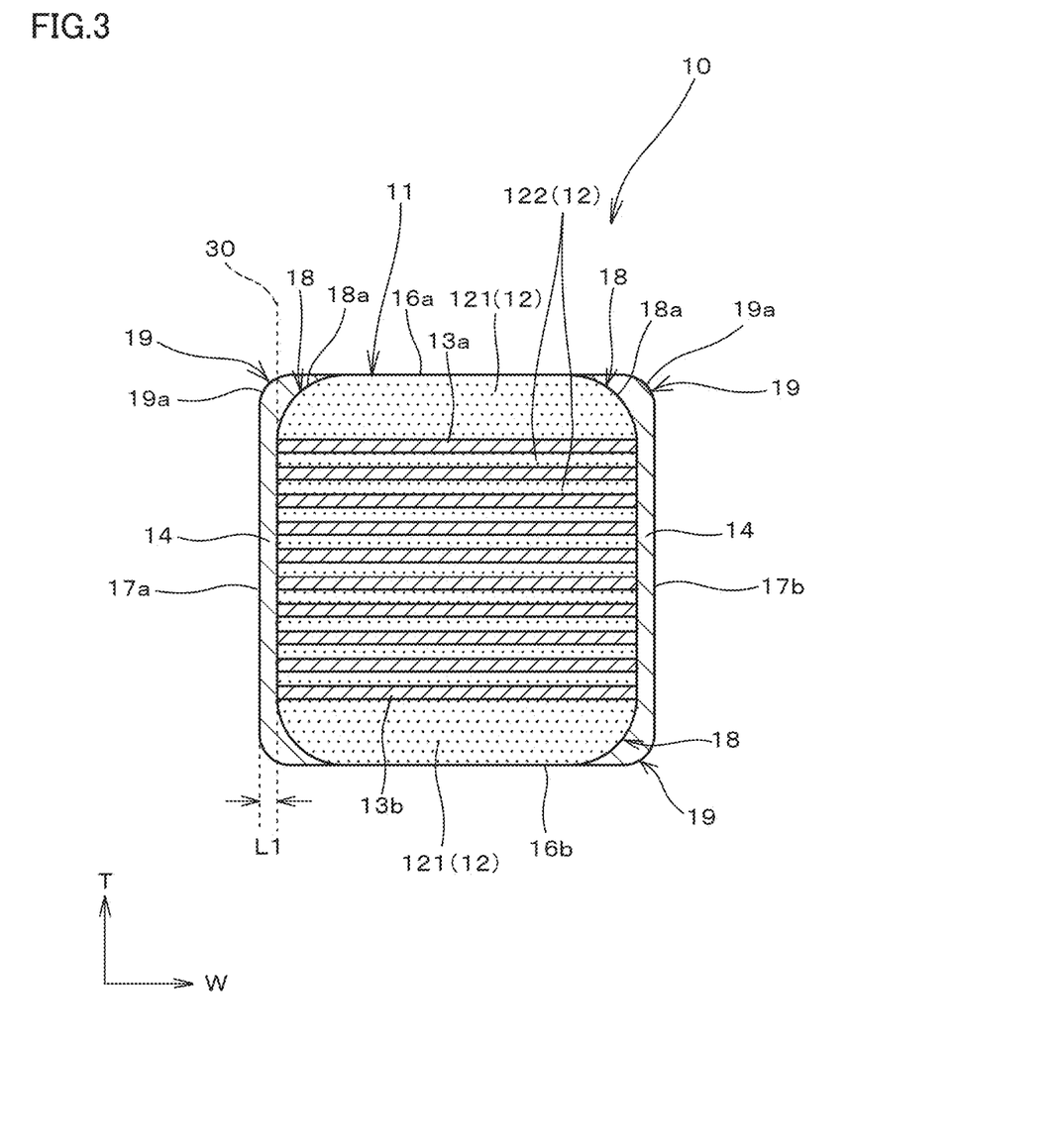
FIG. 3 is a schematic cross-sectional view along the line of the multilayer ceramic capacitor shown in FIG. 1.

FIG. 1 is a perspective view schematically showing a multilayer ceramic capacitor 10 according to a first preferred embodiment of the present invention. FIG. 2 is a schematic cross-sectional view along the line II-II of multilayer ceramic capacitor 10 shown in FIG. 1. FIG. 3 is a schematic cross-sectional view along the line of multilayer ceramic capacitor 10 shown in FIG. 1.

As shown in FIGS. 1 to 3, multilayer ceramic capacitor 10 is an electronic component having a parallelepiped shape and including a multilayer body 11 and a pair of external electrodes 20a and 20b. The pair of external electrodes 20a and 20b are opposed to each other as shown in FIG. 1.

A direction in which external electrodes 20a and 20b are opposed to each other is defined as a length direction L of multilayer ceramic capacitor 10, a direction of layering of dielectric layers 12 and internal electrodes 13a and 13b which will be described later is defined as a layering direction T, and a direction orthogonal or substantially orthogonal to both of length direction L and layering direction T is defined as a width direction W. Any two directions of length direction L, layering direction T, and width direction W are directions orthogonal or substantially orthogonal to each other.

The cross-sectional view shown in FIG. 3 is obtained by cutting multilayer body 11 at a position at a central portion in length direction L and defined in width direction W and layering direction T. The position at the central portion in length direction L of multilayer body 11 is the same or substantially the same as a position at a central portion in length direction L of multilayer ceramic capacitor 10.

Multilayer body 11 includes a first end surface 15a and a second end surface 15b opposed to each other in length direction L, a first main surface 16a and a second main surface 16b opposed to each other in layering direction T, and a first side surface 17a and a second side surface 17b opposed to each other in width direction W.

A corner and a ridgeline portion of multilayer body 11 are rounded. The corner refers to a portion where three surfaces of multilayer body 11 intersect with one another and the ridgeline portion refers to a portion where two surfaces of multilayer body 11 intersect with each other.

Multilayer ceramic capacitor 10 preferably has a dimension in length direction L of, for example, not smaller than about 0.4 mm and not larger than about 3.2 mm, a dimension in width direction W of, for example, not smaller than about 0.2 mm and not larger than about 1.6 mm, and a dimension in layering direction T of, for example, not smaller than about 0.2 mm and not larger than about 1.6 mm. The dimension of multilayer body 11, however, is not limited to the numeric values described above. The dimension of multilayer body 11 can be measured with a micrometer or an optical microscope.

As shown in FIGS. 2 and 3, multilayer body 11 includes a plurality of dielectric layers 12 and a plurality of internal electrodes 13a and 13b that are layered and a side margin portion 14. Internal electrodes 13a and 13b include a first internal electrode 13a and a second internal electrode 13b. As shown in FIG. 3, a plurality of first internal electrodes 13a and a plurality of second internal electrodes 13b are alternately layered with dielectric layers 12 being interposed therebetween, and side margin portion 14 is provided on each outer side in width direction W.

As shown in FIGS. 2 and 3, dielectric layers 12 include an outer dielectric layer 121 located on an outer side in layering direction T relative to each of internal electrodes 13a and 13b located outermost in layering direction T and an inner dielectric layer 122 located between two internal electrodes 13a and 13b adjacent in layering direction T.

More specifically, outer dielectric layer 121 is located between internal electrode 13a located outermost in layering direction T and first main surface 16a of multilayer body 11 and between internal electrode 13b located outermost in layering direction T and second main surface 16b of multilayer body 11. Inner dielectric layer 122 is located between first internal electrode 13a and second internal electrode 13b adjacent in layering direction T. Outer dielectric layer 121 preferably has a thickness of, for example, not smaller than about 5 μm and not larger than about 50 μm, and the thickness is preferably smaller than a radius of curvature of a first curve 18a which will be described later. Inner dielectric layer 122 preferably has a thickness of, for example, not smaller than 0.35 μm and not larger than about 1.8 μm.

Dielectric layer 12 is preferably composed of a ceramic material mainly including, for example, $BaTiO_3$, $CaTiO_3$, $SrTiO_3$, or $CaZrO_3$. A secondary component, such as an Mn compound, an Fe compound, a Cr compound, a Co compound, or an Ni compound, for example, may be included in such a main component.

Side margin portion 14 is located between first side surface 17a of multilayer body 11 and internal electrodes 13a and 13b and between second side surface 17b of multilayer body 11 and internal electrodes 13a and 13b in width direction W. In other words, when any cross-section including length direction L and width direction W of multilayer body 11 is viewed in layering direction T, side margin portion 14 is a region where neither of first internal electrode 13a and second internal electrode 13b is located.

Side margin portion 14 preferably has a dimension L1 (see FIG. 3) in width direction W, that is, a thickness of, for example, not smaller than about 5 μm and not larger than about 50 μm.

By way of example, side margin portion 14 includes a resin and glass. In this case, a thermosetting resin, such as an epoxy resin, for example, can be used as the resin. Ceramic including alumina and glass is another example of a composition of side margin portion 14.

First internal electrode 13a extends to first end surface 15a of multilayer body 11, and does not extend to second end surface 15b. Second internal electrode 13b extends to second end surface 15b of multilayer body 11, and does not extend to first end surface 15a.

First internal electrode 13a includes an opposing electrode portion which is opposed to second internal electrode 13b and a drawn electrode portion which extends from the opposing electrode portion to first end surface 15a of multilayer body 11. Second internal electrode 13b includes an opposing electrode portion which is opposed to first internal electrode 13a and a drawn electrode portion which extends from the opposing electrode portion to second end surface 15b of multilayer body 11.

As the opposing electrode portion of first internal electrode 13a is opposed to the opposing electrode portion of second internal electrode 13b with dielectric layer 12 being interposed therebetween, a capacitance is generated and a function as the capacitor is performed.

First internal electrode 13a and second internal electrode 13b preferably include a metal such as Ni, Cu, Ag, Pd, and Au or an alloy of Ag and Pd, for example. First internal electrode 13a and second internal electrode 13b may further include dielectric particles based on a composition the same or substantially the same as ceramic included in dielectric layer 12.

First internal electrode 13a and second internal electrode 13b preferably have a thickness of, for example, not smaller than about 0.3 μm and not larger than about 1.0 μm. The number of layered internal electrodes including first internal electrode 13a and second internal electrode 13b is preferably, for example, not smaller than 100 and not larger than 800.

Figure 4:
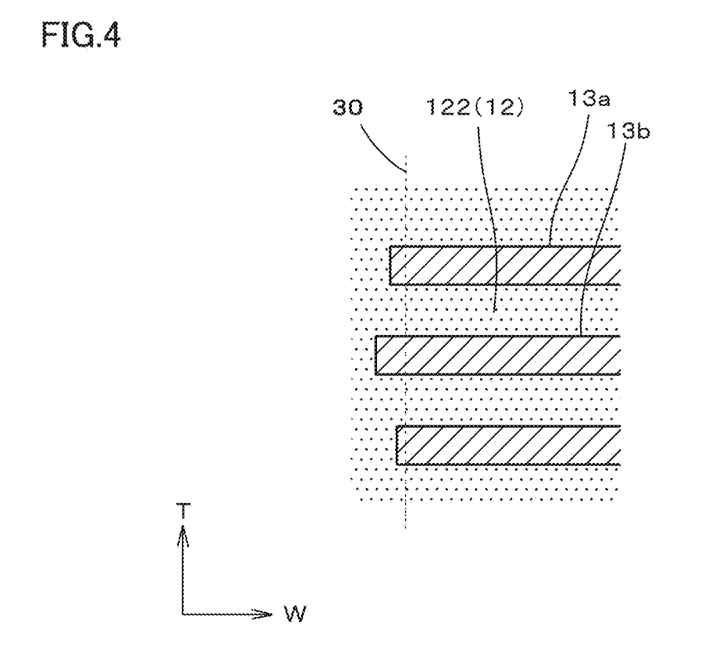
FIG. 4 is an enlarged view of ends in a width direction of internal electrodes when a cross-section obtained by cutting a multilayer body at a position at a central portion in a length direction and defined in the width direction and a layering direction is viewed.

FIG. 4 is an enlarged view of ends in width direction W of internal electrodes 13a and 13b when a cross-section obtained by cutting multilayer body 11 at the position at the central portion in length direction L and defined in width direction W and layering direction T is viewed. Although positions of the ends in width direction W of internal electrodes 13a and 13b appear to be aligned in FIG. 3, positions of the ends in width direction W of internal electrodes 13a and 13b are actually varied as shown in the enlarged view in FIG. 4.

Although FIG. 4 shows only the ends of some of internal electrodes 13a and 13b, in multilayer ceramic capacitor 10 in the present preferred embodiment, when the cross-section obtained by cutting multilayer body 11 at the position at the central portion in length direction L and defined in width direction W and layering direction T is viewed, variation in distance in width direction W from a straight line 30 that connects ends of two internal electrodes 13a and 13b located outermost in layering direction T to each other to respective ends of the plurality of internal electrodes 13a and 13b is preferably not larger than about 0.2, for example. Variation in distance refers to a value calculated by dividing a difference from an average value of the distances in regard to internal electrodes 13a and 13b by an average value of the distances. For example, when distances in width direction W from straight line 30 to respective ends of internal electrodes 13a and 13b are denoted as L1, L2, L3, . . . , and Ln (n representing the total number of internal electrodes 13a and 13b) and when an average value of all distances ((L1+L2+L3+ . . . +Ln)/n) is denoted as La, the difference from the average value of the distances in regard to internal electrodes 13a and 13b is expressed as (L1−La), (L2−La), (L3−La), . . . , and (Ln−La) and variation is expressed as (L1−La)/La, (L2−La)/La, (L3−La)/La, . . . , and (Ln−La)/La. All of these variations are preferably equal to or smaller than about 0.2, for example.

For example, by separately forming side margin portion 14 as in a non-limiting example of a manufacturing method which will be described below, instead of integrally making dielectric layers 12 and side margin portion 14, a structure in which ends of internal electrodes 13a and 13b are aligned within a certain range is obtained.

When the cross-section shown in FIG. 3, that is, the cross-section obtained by cutting multilayer body 11 at the position at the central portion in length direction L and defined in width direction W and layering direction T, is viewed, a first ridgeline portion 18 that connects straight line 30 that connects ends of two internal electrodes 13a and 13b located outermost in layering direction T to each other to one of first main surface 16a and second main surface 16b has first curve 18a preferably having a radius of curvature not smaller than about 10 μm, for example. Although FIG. 3 shows straight line 30 that connects ends located on a side of first side surface 17a, of first internal electrode 13a and second internal electrode 13b located on the outer side in layering direction T to each other, a straight line that connects the other ends thereof located on a side of second side surface 17b to each other is also to be understood similarly. Specifically, first ridgeline portion 18 located on the side of second side surface 17b also has first curve 18a preferably having a radius of curvature not smaller than about 10 μm, for example.

When the cross-section shown in FIG. 3 is viewed, a second ridgeline portion 19 that connects one of first main surface 16a and second main surface 16b to one of first side surface 17a and second side surface 17b has a second curve 19a smaller in radius of curvature than first curve 18a. In other words, first curve 18a located on an inner side is larger in radius of curvature than second curve 19a located on an outer side. Preferably, first curve 18a is preferably larger in radius of curvature than second curve 19a by at least about 10%, for example. In the cross-section shown in FIG. 3, there are four second ridgeline portions 19 and each of them has second curve 19a preferably having a radius of curvature not smaller than about 8 μm, for example.

The radius of curvature is dependent on a size of multilayer body 11. When multilayer body 11 has a dimension in layering direction T of about 0.3 mm and a dimension in width direction W of about 0.3 mm, second curve 19a preferably has a radius of curvature not smaller than about 13 μm and not larger than about 24 μm and first curve 18a preferably has a radius of curvature not smaller than about 16 μm and not larger than about 28 μm, for example. When multilayer body 11 has a dimension in layering direction T of about 0.5 mm and a dimension in width direction W of about 0.5 mm, second curve 19a preferably has a radius of curvature not smaller than about 25 μm and not larger than about 42 μm and first curve 18a preferably has a radius of curvature not smaller than about 30 μm and not larger than about 50 μm, for example. When multilayer body 11 has a dimension in layering direction T of about 1.25 mm and a dimension in width direction W of about 1.25 mm, second curve 19a preferably has a radius of curvature not smaller than about 33 μm and not larger than about 167 μm and first curve 18a preferably has a radius of curvature not smaller than about 40 μm and not larger than about 200 μm, for example. When multilayer body 11 has a dimension in layering direction T of about 1.6 mm and a dimension in width direction W of about 1.6 mm, second curve 19a preferably has a radius of curvature not smaller than about 42 μm and not larger than about 167 μm and first curve 18a preferably has a radius of curvature not smaller than about 50 μm and not larger than about 200 μm, for example.

The radius of curvature of first curve 18a of first ridgeline portion 18 and the radius of curvature of second curve 19a of second ridgeline portion 19 are determined by cutting multilayer body 11 at the position at the central portion in length direction L or polishing multilayer body 11 to the position at the central portion to expose the cross-section defined in width direction W and layering direction T and observing first ridgeline portion 18 and second ridgeline portion 19 in the cross-section with a scanning electron microscope. The radius of curvature of the curve can be determined by a known method.

An extension of straight line 30 described above intersects with second curve 19a. In other words, in the presence of side margin portion 14, first side surface 17a and second side surface 17b are located on the outer side in width direction W relative to the ends of internal electrodes 13a and 13b. Therefore, the extension of straight line 30 that connects ends of two internal electrodes 13a and 13b located outermost in layering direction T to each other intersects with second curve 19a.

When a ridgeline portion having a structure before the side margin portion is formed forms a right angle, with a decrease in thickness of the side margin portion, the radius of curvature of the ridgeline portion at the surface of the multilayer ceramic capacitor becomes smaller and chipping is more likely. In multilayer ceramic capacitor 10 according to the present preferred embodiment, however, first ridgeline portion 18 having the structure before side margin portion 14 is formed is curved and hence second ridgeline portion 19 located at the surface of multilayer ceramic capacitor 10 can have a large radius of curvature. Therefore, even though side margin portion 14 is decreased in thickness, chipping can be reduced or prevented.

Multilayer ceramic capacitor 10 in the present preferred embodiment can thus achieve a decrease in thickness of side margin portion 14 and a reduction or prevention of the occurrence of chipping.

The thickness of dielectric layer 12 and the thickness of each of first internal electrode 13a and second internal electrode 13b can be measured with a method described below.

Initially, the cross-section at the position at the central portion in length direction L of multilayer body 11 that is defined in layering direction T and width direction W, in other words, the cross-section exposed by polishing a surface orthogonal or substantially orthogonal to length direction L of multilayer body 11 to the position at the central portion in length direction L, is observed with the scanning electron microscope. Then, a thickness of dielectric layer 12 is measured on five lines in total including the centerline along layering direction T that passes through the center of the exposed cross-section and two lines equidistantly defined on each of opposing sides of the centerline. An average value of these five measurement values is defined as the thickness of dielectric layer 12.

For further accuracy, multilayer body 11 is divided into an upper portion, a central portion, and a lower portion in layering direction T, and five measurement values described above are obtained for each of the upper portion, the central portion, and the lower portion and an average value of all obtained measurement values is defined as the thickness of dielectric layer 12.

A non-limiting example of a method of measuring a thickness of dielectric layer 12 is described above, and the thickness of first internal electrode 13a and second internal electrode 13b can also be measured by a method in conformity with the method of measuring the thickness of dielectric layer 12 with the scanning electron microscope at the cross-section the same as the cross-section in which the thickness of dielectric layer 12 is measured.

First external electrode 20a is provided on first end surface 15a of multilayer body 11. In the present preferred embodiment, first external electrode 20a is provided on the entire or substantially the entire first end surface 15a of multilayer body 11 and extends from first end surface 15a to first main surface 16a, second main surface 16b, first side surface 17a, and second side surface 17b. First external electrode 20a is electrically connected to first internal electrode 13a.

Second external electrode 20b is provided on second end surface 15b of multilayer body 11. In the present preferred embodiment, second external electrode 20b is provided on the entire or substantially the entire second end surface 15b of multilayer body 11 and extends from second end surface 15b to first main surface 16a, second main surface 16b, first side surface 17a, and second side surface 17b. Second external electrode 20b is electrically connected to second internal electrode 13b.

First external electrode 20a and second external electrode 20b each preferably include, for example, an underlying electrode layer and a plated layer arranged on the underlying electrode layer.

The underlying electrode layer preferably includes at least one of a baked electrode layer, a resin electrode layer, and a thin electrode layer as will be described below.

The baked electrode layer preferably includes, for example, glass and a metal, and a single baked electrode layer or a plurality of baked electrode layers may be provided. The baked electrode layer preferably includes a metal such as, for example, Cu, Ni, Ag, Pd, and Au or an alloy of Ag and Pd.

The baked electrode layer is formed by applying a conductive paste including glass and the metal to the multilayer body and baking the multilayer body. Baking may be performed simultaneously with or after firing of the multilayer body.

The resin electrode layer can be provided, for example, as a layer preferably including conductive particles and a thermosetting resin. In forming the resin electrode layer, the resin electrode layer may be directly formed on a ceramic body without forming the baked electrode layer. A single resin electrode layer or a plurality of resin electrode layers may be provided.

The thin electrode layer is preferably not larger than about 1 μm formed, for example, by deposition of metal particles, and can be formed by a known thin film formation method such as sputtering or vapor deposition.

The plated layer provided on the underlying electrode layer preferably includes, for example, at least one of a metal such as Cu, Ni, Ag, Pd, and Au or an alloy of Ag and Pd. A single plated layer or a plurality of plated layers may be provided. The plated layer is preferably in a two-layered structure of an Ni plated layer and an Sn plated layer, for example. The Ni plated layer prevents erosion of the underlying electrode layer by solder in mounting multilayer ceramic capacitor 10. The Sn plated layer improves solderability in mounting multilayer ceramic capacitor 10.

First external electrode 20a and second external electrode 20b do not have to include the underlying electrode layer described above, and may be formed from the plated layer arranged directly on multilayer body 11. In this case, the plated layer is directly connected to first internal electrode 13a or second internal electrode 13b.

Figure 5A:
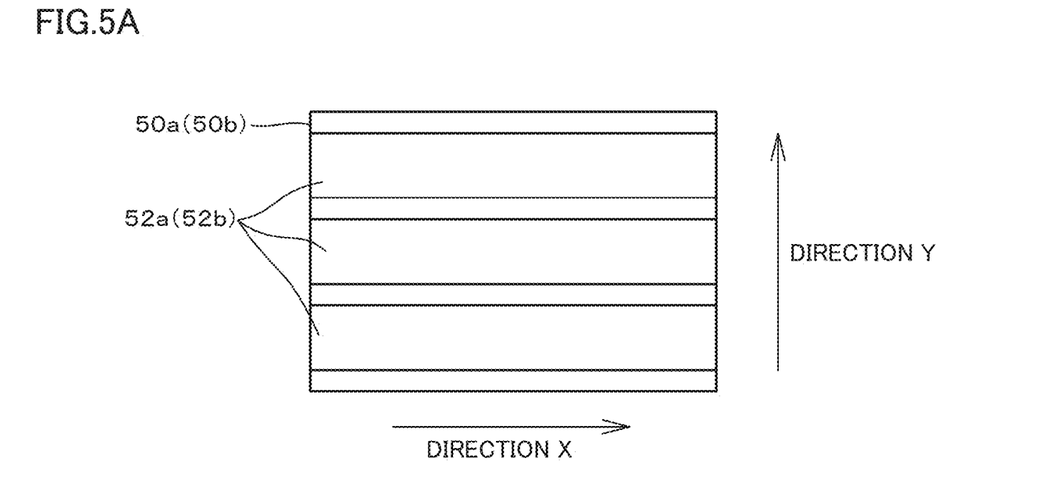
FIG. 5A is a schematic diagram showing a ceramic green sheet with a conductive film provided thereon.
Figure 5B:
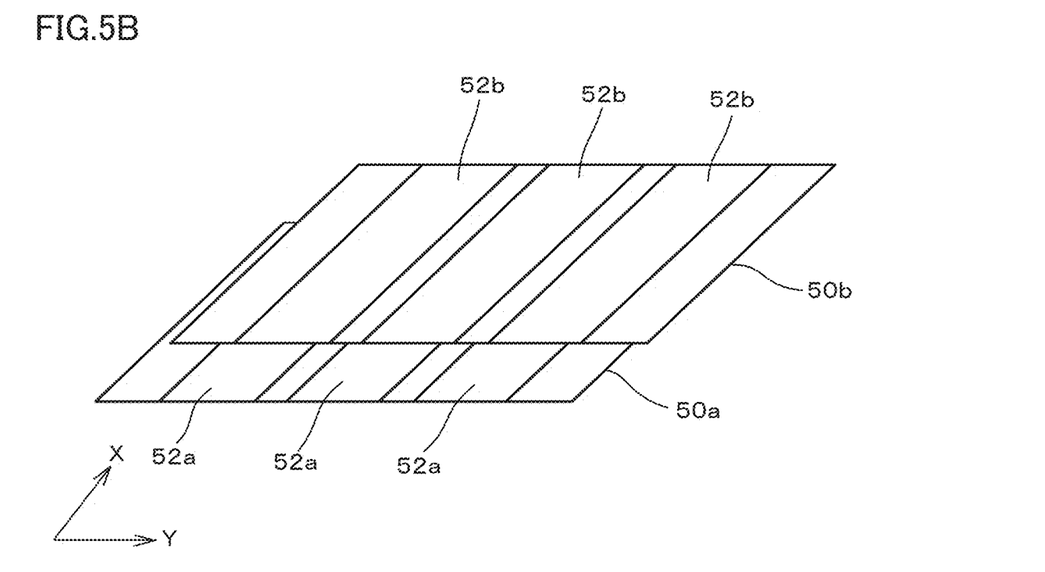
FIG. 5B is a schematic diagram showing layering of ceramic green sheets each with the conductive film provided thereon.

An exemplary method of manufacturing multilayer ceramic capacitor 10 with the structure described above will be described below. FIG. 5A is a schematic diagram showing a ceramic green sheet having a conductive film formed thereon. FIG. 5B is a schematic diagram showing layering of ceramic green sheets each having the conductive film formed thereon.

Initially, a ceramic green sheet for forming outer dielectric layer 121 and a ceramic green sheet for forming inner dielectric layer 122 are prepared. A known ceramic green sheet can be used as the ceramic green sheets.

Then, as shown in FIG. 5A, a paste for the internal electrode is printed in stripes on the surfaces of prepared ceramic green sheets 50a and 50b and dried. Ceramic green sheet 50b and ceramic green sheet 50a are alternately layered. A direction in which the paste for the internal electrode extends in stripes is defined as a direction X and a direction orthogonal to direction X on the ceramic green sheet is defined as a direction Y. A conductive film 52a (52b) to be first internal electrode 13a (second internal electrode 13b) is thus formed. Various methods such as, for example, screen printing, ink jet printing, and gravure printing can be used as the printing method.

Then, after the ceramic green sheet for forming outer dielectric layer 121 is layered, a plurality of ceramic green sheets 50a and 50b including conductive films 52a and 52b formed thereon, respectively, are layered to be displaced from each other in direction Y as shown in FIG. 5B. By layering the ceramic green sheet for forming outer dielectric layer 121 on these ceramic green sheets, a mother multilayer body is obtained.

Then, the mother multilayer body is pressed by a method such, for example, as rigid body press or hydrostatic press. A structure 60 shown in FIG. 6 is obtained by cutting the pressed mother multilayer body into chips.

Figure 6:
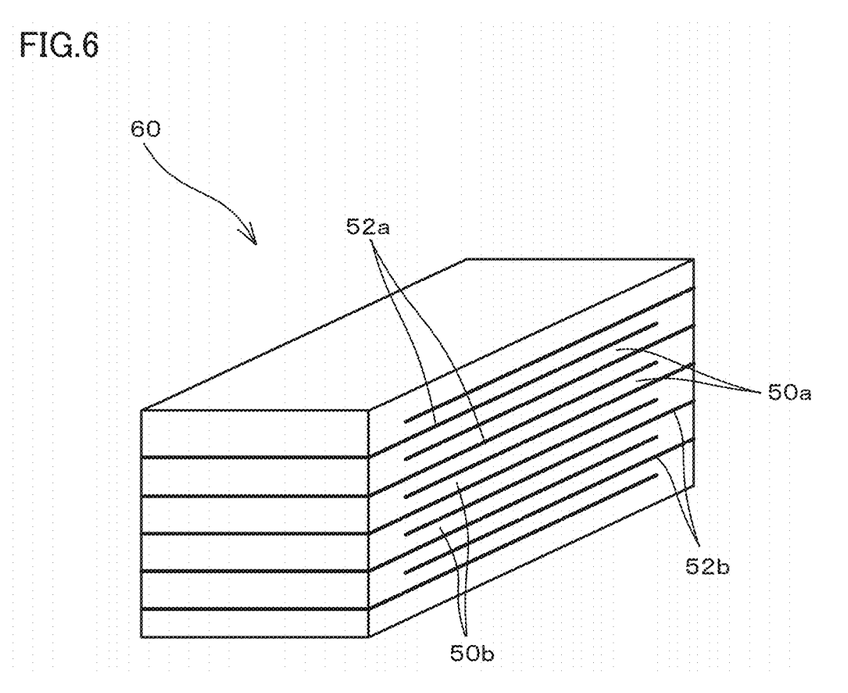
FIG. 6 is a perspective view showing an exemplary appearance of an unfired structure made during manufacturing of the multilayer ceramic capacitor.

As shown in FIG. 6, only conductive film 52a of ceramic green sheet 50a is exposed at one end surface of structure 60 and only conductive film 52b of ceramic green sheet 50b is exposed at the other end surface. Conductive film 52a of ceramic green sheet 50a and conductive film 52b of ceramic green sheet 50b are exposed at both of the side surfaces of structure 60.

Then, structure 60 is fired at a prescribed firing temperature. Depending on a material for dielectric layer 12 or internal electrodes 13a and 13b, the firing temperature is preferably, for example, not lower than about 900° C. and not higher than about 1300° C.

Then, for example, sand blasting or barrel polishing is performed to round and curve the corner and the ridgeline portion of the fired structure. Treatment is performed such that first ridgeline portion 18 described above has first curve 18a in finished multilayer ceramic capacitor 10. Yet-to-be fired structure 60 may be subjected to such treatment as rounding and curving the corner and the ridgeline portion, and thereafter fired.

Then, a ceramic green sheet for the side margin portion for forming side margin portion 14 is prepared. The ceramic green sheet for the side margin portion can be made from ceramic slurry containing alumina, glass, an organic binder, and an organic solvent. The prepared ceramic green sheet for the side margin portion is provided to be opposed to the side surface where the internal electrodes of the structure are exposed, and punched by being pressed against the side surface. A layer to be side margin portion 14 is thus formed. By the similar method, a layer to be side margin portion 14 is formed also on the side surface on the opposite side. Side margin portion 14 may be formed by spraying a material or coating with a material, for example.

Then, a treatment such as rounding and curving the corner and the ridgeline portion is performed. Treatment is performed such that second ridgeline portion 19 described above has second curve 19a in finished multilayer ceramic capacitor 10.

Then, a paste for the external electrode is applied to each of opposing end surfaces of the structure and thereafter the structure is fired at a prescribed firing temperature. The firing temperature is preferably, for example, not lower than about 800° C. and not higher than about 900° C.

Thereafter, a plated layer is formed as necessary. When external electrodes 20a and 20b include a plated layer, the plated layer is formed on the underlying electrode layer.

With the manufacturing method described above, multilayer ceramic capacitor 10 in which side margin portion 14 is made of ceramic including alumina and glass is obtained. The manufacturing method described above is by way of example, and the method of manufacturing multilayer ceramic capacitor 10 is not limited to the manufacturing method described above.

Another exemplary method of manufacturing multilayer ceramic capacitor 10 with the structure described above will be described below. When side margin portion 14 of multilayer ceramic capacitor 10 includes a resin and glass, it can be manufactured by a method described below. Since the method is the same or substantially the same as the manufacturing method described above up to a step of obtaining the fired structure with the corner and the ridgeline portion rounded, detailed description thereof will not be repeated.

First external electrode 20a and second external electrode 20b are formed on respective opposing end surfaces of the fired structure with the corner and the ridgeline portion rounded. In other words, the underlying electrode layer is formed by coating the entirety or substantially the entirety of both of the end surfaces of the fired structure and a portion of both of the main surfaces and both of the side surfaces with the paste for the external electrode and baking the structure, and thereafter the plated layer is formed on the underlying electrode layer.

Figure 7:
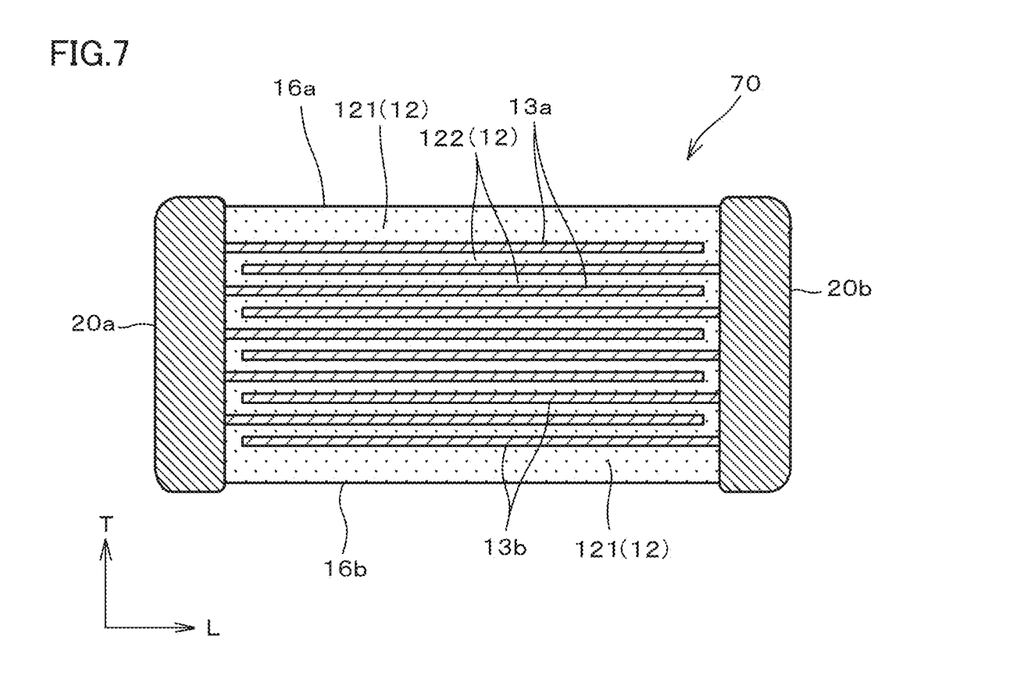
FIG. 7 is a side view of a fired structure made during manufacturing of the multilayer ceramic capacitor.

As shown in FIG. 7, first internal electrode 13a and second internal electrode 13b are exposed at the side surfaces of a fired structure 70. Therefore, first external electrode 20a and second external electrode 20b are formed so as not to cause short circuiting. Specifically, first external electrode 20a is formed in a region where no second internal electrode 13b extends and second external electrode 20b is formed in a region where no first internal electrode 13a extends.

Finally, in order to form side margin portion 14, side surfaces of structure 70 where first internal electrode 13a and second internal electrode 13b are exposed are coated with a resin including glass. For example, side margin portion 14 is formed by coating the structure with a thermoplastic resin containing glass and thereafter heating the structure. The structure is coated with the resin such that second ridgeline portion 19 described above has second curve 19a in finished multilayer ceramic capacitor 10.

Multilayer ceramic capacitor 10 in which side margin portion 14 includes the resin and glass is made by the method above.

Second Preferred Embodiment

In multilayer ceramic capacitor 10 in the first preferred embodiment, ends of none of internal electrodes 13a and 13b are superimposed on first ridgeline portion 18.

In contrast, in a multilayer ceramic capacitor in a second preferred embodiment of the present invention, an end of an internal electrode located outermost in the layering direction is located at a position superimposed on the first ridgeline portion.

Figure 8:
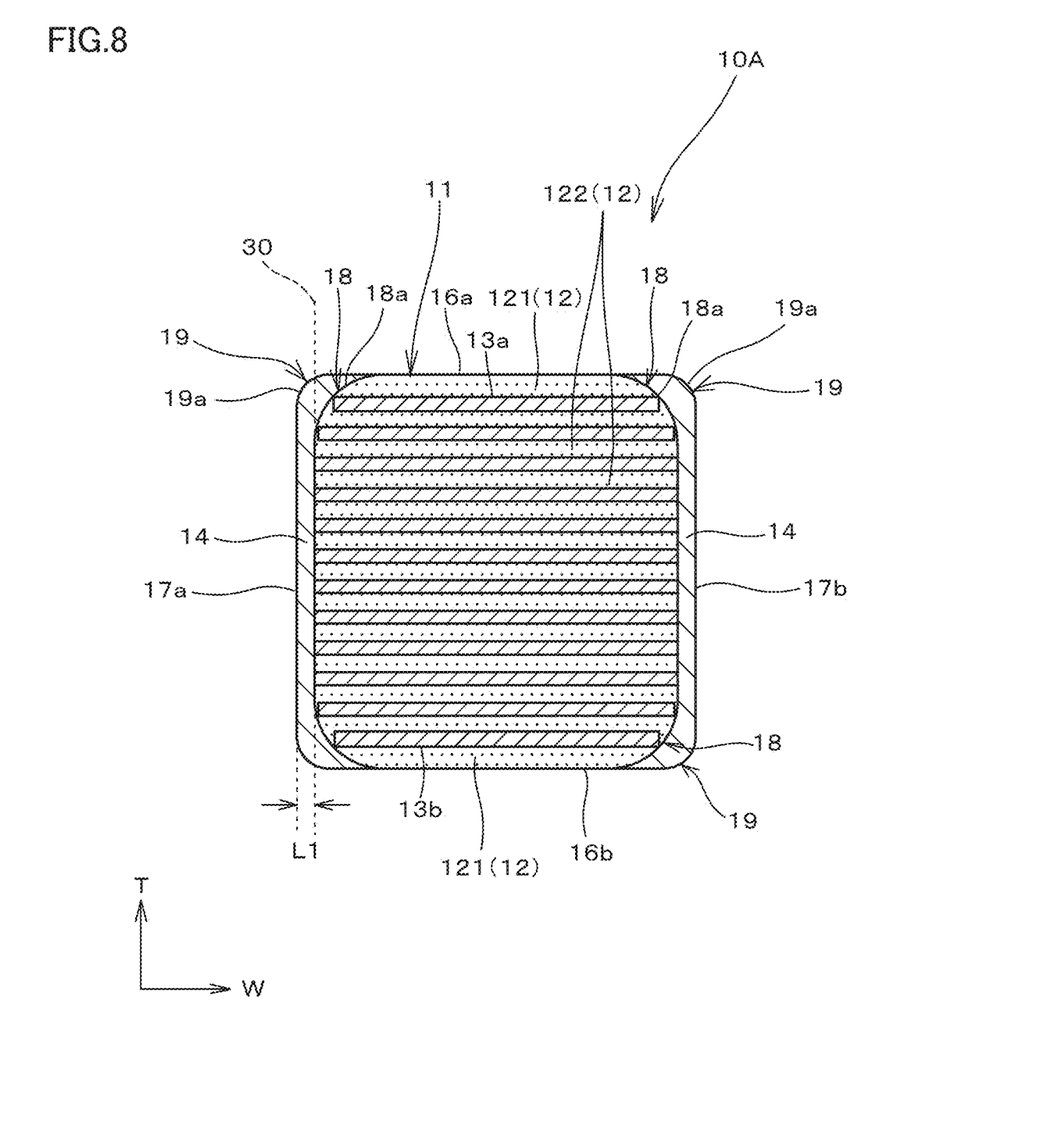
FIG. 8 is a cross-sectional view of a multilayer ceramic capacitor according to a second preferred embodiment of the present invention, the cross-section being obtained by cutting a multilayer body at the position at the central portion in the length direction and defined in the width direction and the layering direction.

FIG. 8 is a cross-sectional view of a multilayer ceramic capacitor 10A according to the second preferred embodiment, the cross-section being obtained by cutting multilayer body 11 at the position at the central portion in length direction L and defined in width direction W and layering direction T similarly to the cross-sectional view shown in FIG. 3.

As shown in FIG. 8, ends of first internal electrode 13a and second internal electrode 13b located outermost in the layering direction are located at positions superimposed on first ridgeline portion 18. In other words, in multilayer ceramic capacitor 10A in the second preferred embodiment, internal electrodes 13a and 13b can be disposed at a further outer side in layering direction T as compared with multilayer ceramic capacitor 10 in the first preferred embodiment. Therefore, the number of internal electrodes 13a and 13b can be increased to increase a capacitance of the capacitor in a multilayer ceramic capacitor having the same size.

As shown in FIG. 8, in multilayer ceramic capacitor 10A in the second preferred embodiment, internal electrodes 13a and 13b located outermost in layering direction T are smaller in dimension in width direction W than other internal electrodes 13a and 13b. Therefore, even though side margin portion 14 has a small thickness and second ridgeline portion 19 has a large radius of curvature, a decrease in the interval between ends of internal electrodes 13a and 13b located outermost in layering direction T and second ridge-line portion 19 can be reduced or prevented and moisture resistance of multilayer ceramic capacitor 10A can be ensured.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including a plurality of dielectric layers and a plurality of internal electrodes that are layered, the multilayer body including a first main surface and a second main surface opposed to each other in a layering direction of the dielectric layers and the internal electrodes, a first side surface and a second side surface opposed to each other in a width direction orthogonal or substantially orthogonal to the layering direction, and a first end surface and a second end surface opposed to each other in a length direction orthogonal or substantially orthogonal to the layering direction and the width direction; and
    external electrodes electrically connected to the internal electrodes and provided on each of the first end surface and the second end surface of the multilayer body; wherein
    when a cross-section obtained by cutting the multilayer body at a position at a central portion in the length direction and defined in the width direction and the layering direction is viewed, a variation in distance in a width direction W from a straight line that connects ends of two of the internal electrodes located outermost in the layering direction to each other to respective ends of the plurality of internal electrodes is not larger than about 0.2, a first ridgeline portion that connects the straight line that connects the ends of two of the internal electrodes located outermost in the layering direction to each other to one of the first main surface and the second main surface has a first curve, and a second ridgeline portion that connects one of the first main surface and the second main surface to one of the first side surface and the second side surface has a second curve; and
    the first curve has a larger radius of curvature than the second curve.

2. The multilayer ceramic capacitor according to claim 1, wherein the first curve has a larger radius of curvature than the second curve by at least about 10%.

3. The multilayer ceramic capacitor according to claim 1, wherein an extension of the straight line intersects with the second curve.

4. The multilayer ceramic capacitor according to claim 1, wherein
    the multilayer body has a dimension in the layering direction of about 0.3 mm and a dimension in the width direction of about 0.3 mm; and
    the radius of curvature of the first curve is not smaller than about 16 μm and not larger than about 28 μm.

5. The multilayer ceramic capacitor according to claim 1, wherein a side margin portion located between the first side surface and the internal electrodes and between the second side surface and the internal electrodes in the width direction includes a resin and glass.

6. The multilayer ceramic capacitor according to claim 5, wherein the side margin portion has a dimension in the width direction not smaller than about 5 μm and not larger than about 50 μm.

7. The multilayer ceramic capacitor according to claim 1, wherein a side margin portion located between the first side surface and the internal electrodes and between the second side surface and the internal electrodes in the width direction includes ceramic including alumina and glass.

8. The multilayer ceramic capacitor according to claim 7, wherein the side margin portion has a dimension in the width direction not smaller than about 5 μm and not larger than about 50 μm.

9. The multilayer ceramic capacitor according to claim 1, wherein the end of the internal electrode located outermost in the layering direction is located at a position superimposed on the first ridgeline portion.

10. The multilayer ceramic capacitor according to claim 1, wherein
    the multilayer body has a dimension in the layering direction of about 0.5 mm and a dimension in the width direction of about 0.5 mm; and
    the radius of curvature of the first curve is not smaller than about 30 μm and not larger than about 50 μm.

11. The multilayer ceramic capacitor according to claim 1, wherein
    the multilayer body has a dimension in the layering direction of about 1.25 mm and a dimension in the width direction of about 1.25 mm; and
    the radius of curvature of the first curve is not smaller than about 40 μm and not larger than about 200 μm.

12. The multilayer ceramic capacitor according to claim 1, wherein
    the multilayer body has a dimension in the layering direction of about 1.6 mm and a dimension in the width direction of about 1.6 mm; and
    the radius of curvature of the first curve is not smaller than about 50 μm and not larger than about 200 μm.

13. The multilayer ceramic capacitor according to claim 1, wherein the multilayer ceramic capacitor has a dimension in the length direction of not smaller than about 0.4 mm and not larger than about 3.2 mm, a dimension in the width direction of not smaller than about 0.2 mm and not larger than about 1.6 mm, and a dimension in the layering direction of not smaller than about 0.2 mm and not larger than about 1.6 mm.

14. The multilayer ceramic capacitor according to claim 1, wherein the plurality of dielectric layers include a first outer dielectric layer located between an internal electrode of the plurality of internal electrodes located outermost in the layering direction and the first main surface body, and a second outer dielectric layer located between an internal electrode of the plurality of internal electrodes located outermost in the layering direction and the second main surface body.

15. The multilayer ceramic capacitor according to claim 14, wherein each of the first and second outer dielectric layers has a thickness of not smaller than about 5 μm and not larger than about 50 μm.

16. The multilayer ceramic capacitor according to claim 14, wherein each of the first and second outer dielectric layers has a thickness smaller than the radius of curvature of the first curve.

17. The multilayer ceramic capacitor according to claim 1, wherein the plurality of dielectric layers include inner dielectric layers located between adjacent internal electrodes of the plurality of internal electrodes.

18. The multilayer ceramic capacitor according to claim 17, wherein each of the inner dielectric layers has a thickness of not smaller than 0.35 µm and not larger than about 1.8 µm.

19. The multilayer ceramic capacitor according to claim 1, wherein each of the plurality of dielectric layers includes a ceramic material mainly including $BaTiO_3$, $CaTiO_3$, $SrTiO_3$, or $CaZrO_3$.

20. The multilayer ceramic capacitor according to claim 1, wherein each of the plurality of internal electrodes includes at least one of Ni, Cu, Ag, Pd, or Au or an alloy of Ag and Pd.

\* \* \* \* \*